(12) United States Patent
Balakrishnan et al.

(10) Patent No.: US 8,589,779 B2
(45) Date of Patent: Nov. 19, 2013

(54) EVENT-SENSITIVE CONTENT FOR MOBILE DEVICES

(75) Inventors: Govind Balakrishnan, Foster City, CA (US); Andrew Borovsky, New York, NY (US); Matthew Millar, Thame (GB); Chris Thilgen, San Francisco, CA (US); Angus Davis, Pleasant Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1001 days.

(21) Appl. No.: 11/960,472

(22) Filed: Dec. 19, 2007

(65) Prior Publication Data

US 2008/0222520 A1 Sep. 11, 2008

Related U.S. Application Data

(60) Provisional application No. 60/893,865, filed on Mar. 8, 2007.

(51) Int. Cl.
*G06N 3/00* (2006.01)

(52) U.S. Cl.
USPC .......................................... 715/202

(58) Field of Classification Search
USPC ......... 715/201, 202, 209, 210, 234, 273, 276, 715/277, 760, 864
See application file for complete search history.

(56) References Cited

U.S. PATENT DOCUMENTS

| | | |
|---|---|---|
| 5,797,098 A | 8/1998 | Schroeder et al. |
| 6,025,841 A | 2/2000 | Finkelstein et al. |
| 6,188,401 B1 * | 2/2001 | Peyer ............................ 715/805 |
| 6,195,569 B1 | 2/2001 | Frederiksen |
| 6,292,099 B1 * | 9/2001 | Tse et al. ....................... 340/506 |
| 6,381,468 B1 | 4/2002 | Larsen et al. |
| 6,512,529 B1 | 1/2003 | Janssen et al. |
| 6,529,744 B1 | 3/2003 | Birkler et al. |
| 6,729,929 B1 | 5/2004 | Sayers et al. |
| 6,732,358 B1 | 5/2004 | Siefert |
| 6,757,372 B1 | 6/2004 | Dunlap et al. |
| 6,775,362 B1 | 8/2004 | Ransom |
| 6,892,067 B1 | 5/2005 | Sharma et al. |
| 6,928,468 B2 | 8/2005 | Leermakers |
| 6,964,061 B2 | 11/2005 | Cragun et al. |
| 6,976,217 B1 | 12/2005 | Vertaschitsch et al. |

(Continued)

OTHER PUBLICATIONS

Flanagan, David, "Java(tm) Foundation Classes in a Nutshell," Sep. 1999, O'Reilly Publishing, <http://docstore.mik.ua/orelly/java-ent/jfc/ch02_06.htm>, Section 2.6.*

(Continued)

*Primary Examiner* — Kyle Stork
(74) *Attorney, Agent, or Firm* — Schwegman Lundberg Woessner P.A.

(57) ABSTRACT

Computer program products, methods and systems for accepting content that defines an event handler. The content is provided to a media player configured to render the content. The event handler is configured to receive an event from an operating system on which the media player runs, the operating system executing on a mobile device having an integrated display and an integrated telephone. The content is presented by the media player on the display. The event is received from the operating system and providing the event to the event handler. And the presentation of the content is modified by the media player based on processing of the event by the event handler.

22 Claims, 5 Drawing Sheets

(56) References Cited

U.S. PATENT DOCUMENTS

| | | | |
|---|---|---|---|
| 6,983,421 B1 | 1/2006 | Lahti et al. | |
| 7,003,327 B1 | 2/2006 | Payne et al. | |
| 7,035,629 B2 | 4/2006 | Fujii | |
| 7,096,474 B2* | 8/2006 | Wong et al. | 719/328 |
| 7,099,685 B2 | 8/2006 | Park et al. | |
| 7,142,977 B2 | 11/2006 | Knuuttila et al. | |
| 7,152,203 B2 | 12/2006 | Gao et al. | |
| 7,158,788 B2 | 1/2007 | Holler et al. | |
| 7,159,500 B2 | 1/2007 | John et al. | |
| 7,165,099 B2 | 1/2007 | Sprigg et al. | |
| 7,167,728 B1 | 1/2007 | Wagner et al. | |
| 7,187,948 B2 | 3/2007 | Alden | |
| 7,243,164 B2 | 7/2007 | Vegge | |
| 7,275,243 B2 | 9/2007 | Gibbons et al. | |
| 7,283,841 B2 | 10/2007 | Luke et al. | |
| 7,299,289 B1 | 11/2007 | Lorenz et al. | |
| 7,299,409 B2* | 11/2007 | Joshi et al. | 715/234 |
| 7,308,689 B2* | 12/2007 | Black et al. | 719/318 |
| 7,310,784 B1 | 12/2007 | Gottlieb et al. | |
| 7,316,003 B1* | 1/2008 | Dulepet et al. | 717/111 |
| 7,319,862 B1 | 1/2008 | Lincoln et al. | |
| 7,403,209 B2 | 7/2008 | Liao et al. | |
| 7,478,158 B1 | 1/2009 | Rodgers et al. | |
| 7,480,422 B2 | 1/2009 | Ackley et al. | |
| 7,634,559 B2 | 12/2009 | Brown | |
| 7,639,943 B1 | 12/2009 | Kalajan | |
| 7,706,782 B1 | 4/2010 | Hosmer et al. | |
| 7,743,339 B1 | 6/2010 | Chanda et al. | |
| 2002/0140729 A1* | 10/2002 | Price et al. | 345/749 |
| 2002/0152239 A1* | 10/2002 | Bautista-Lloyd et al. | 707/513 |
| 2002/0161634 A1* | 10/2002 | Kaars | 705/14 |
| 2002/0161796 A1 | 10/2002 | Sylthe | |
| 2003/0105845 A1 | 6/2003 | Leermakers | |
| 2003/0167318 A1 | 9/2003 | Robbin et al. | |
| 2003/0210270 A1 | 11/2003 | Clow et al. | |
| 2004/0034853 A1 | 2/2004 | Gibbons et al. | |
| 2004/0104938 A1* | 6/2004 | Saraswat et al. | 345/764 |
| 2004/0203384 A1 | 10/2004 | Sugikawa et al. | |
| 2004/0213296 A1 | 10/2004 | Kanayama et al. | |
| 2004/0215652 A1 | 10/2004 | Muller et al. | |
| 2004/0237068 A1 | 11/2004 | Ren | |
| 2004/0260652 A1 | 12/2004 | Rose | |
| 2005/0090246 A1 | 4/2005 | Leermakers | |
| 2005/0131837 A1 | 6/2005 | Sanctis et al. | |
| 2005/0172154 A1 | 8/2005 | Short et al. | |
| 2005/0215238 A1 | 9/2005 | Macaluso | |
| 2005/0226188 A1 | 10/2005 | Santhoff et al. | |
| 2005/0246193 A1 | 11/2005 | Roever et al. | |
| 2005/0246703 A1 | 11/2005 | Ahonen | |
| 2005/0246726 A1 | 11/2005 | Labrou et al. | |
| 2005/0266884 A1 | 12/2005 | Marriott et al. | |
| 2006/0013502 A1 | 1/2006 | Weigand | |
| 2006/0015819 A1 | 1/2006 | Hawkins et al. | |
| 2006/0026304 A1 | 2/2006 | Price | |
| 2006/0123360 A1 | 6/2006 | Anwar et al. | |
| 2006/0153040 A1 | 7/2006 | Girish et al. | |
| 2006/0165104 A1 | 7/2006 | Kaye | |
| 2006/0171515 A1 | 8/2006 | Hintermeister et al. | |
| 2006/0184968 A1 | 8/2006 | Clayton et al. | |
| 2006/0200815 A1 | 9/2006 | Li | |
| 2006/0206918 A1 | 9/2006 | Mclean | |
| 2006/0224943 A1 | 10/2006 | Snyder et al. | |
| 2006/0250578 A1 | 11/2006 | Pohl et al. | |
| 2006/0256130 A1 | 11/2006 | Gonzalez | |
| 2006/0265508 A1 | 11/2006 | Angel et al. | |
| 2007/0026799 A1 | 2/2007 | Wang et al. | |
| 2007/0038931 A1 | 2/2007 | Allaire et al. | |
| 2007/0130331 A1 | 6/2007 | Kao et al. | |
| 2007/0140116 A1 | 6/2007 | Vega-Garcia | |
| 2007/0155426 A1 | 7/2007 | Balakrishnan et al. | |
| 2007/0220504 A1 | 9/2007 | Eker | |
| 2007/0277230 A1 | 11/2007 | Hawkins et al. | |
| 2008/0059533 A1 | 3/2008 | Krikorian | |
| 2008/0077956 A1 | 3/2008 | Morrison et al. | |
| 2008/0127060 A1* | 5/2008 | Reamey | 717/106 |
| 2008/0147671 A1 | 6/2008 | Simon et al. | |
| 2008/0184128 A1 | 7/2008 | Swenson et al. | |
| 2008/0261657 A1 | 10/2008 | Amit | |
| 2008/0268911 A1* | 10/2008 | Eronen et al. | 455/567 |
| 2009/0031418 A1 | 1/2009 | Matsuda et al. | |
| 2009/0042599 A1 | 2/2009 | Scott | |
| 2009/0094272 A1 | 4/2009 | Skriletz | |

OTHER PUBLICATIONS

Adobe Systems Inc., "Flex 2 Developer's Guide" [Online], 2006, San Jose, CA, Retrieved from the Internet: <URL: http://download.macromedia.com/pub/documentation/en/flex/2/flex2_devguide.pdf>, pp. 1-17, 21-39, 83-129, 1113-1129.

European Examiner Stefan Krischer, Notification of Transmittal of the International Search Report and the Written Opinion of the International Searching Authority, or the Declaration for Application No. PCT/US2008/056278, dated Aug. 12, 2009, 15 pages.

Binary Runtime Environment for Wireless—BREW™ 2.1 API Reference, QUALCOMM Incorporated, San Diego, CA, May 8, 2003, cover, copyright and pp. 376-416.

Chanda, "Embedded Document within an Application," Pending U.S. Appl. No. 11/567,111, filed Dec. 5, 2006, 24 pages, to be published by USPTO.

Hosmer, et al., "System and Method for Developing Information for a Wireless Information System," Pending U.S. Appl. No. 10/791,299, filed Mar. 1, 2004, 26 pages, to be published by USPTO.

Morris, et al., "Mobile Rich Media Information System," Pending U.S. Appl. No. 10/791,298, filed Mar. 1, 2004, 43 pages, to be published by USPTO.

Rodgers, et al. "Bandwidth Management System," Pending U.S. Appl. No. 10/791,311, filed Mar. 1, 2004, 27 pages, to be published by USPTO.

USPTO Non-Final Office Action in U.S. Appl. No. 12/577,035, mailed Jul. 25, 2011, 14 pages.

Business Wire, "BSquare Delivers PDF Viewing Capabilities for Windows Powered Devices", Oct. 16, 2000, pp. 1-2.

* cited by examiner

EVENT-SENSITIVE CONTENT FOR MOBILE DEVICES

CROSS-REFERENCE TO RELATED APPLICATIONS

This application claims priority to U.S. Provisional Application No. 60/893,865, filed on Mar. 8, 2007. The disclosure of each prior application is considered part of and is incorporated by reference in the disclosure of this application.

BACKGROUND

Mobile devices with integrated telephones (e.g., smart phones) typically execute a proprietary operating system (OS) on top of which different software applications run, such as electronic mail, short message service, instant messaging, contact management, and electronic games, for example. However, writing applications for a proprietary OS can be difficult and time consuming, especially for content developers who typically do not have extensive training in software development. Some mobile device OS's allow applications to receive events from the OS that indicate, for instance, when a user has pressed a key on the mobile device or when a new message has arrived. Creating content that is sensitive to such events can require intimate knowledge of a mobile device OS's proprietary event model. Moreover, porting event-driven applications created for one proprietary OS to another can require a significant amount of additional software development for each OS the application is ported to.

SUMMARY

In general, one aspect of the subject matter described in this specification can be embodied in a method that includes accepting content that defines an event handler. The content is provided to a media player configured to render the content. The event handler is configured to receive an event from an operating system on which the media player runs, the operating system executing on a mobile device having an integrated display and an integrated telephone. The content is presented by the media player on the display. The event is received from the operating system and providing the event to the event handler. And the presentation of the content is modified by the media player based on processing of the event by the event handler. Other implementations of this aspect include corresponding systems, apparatus, and computer program products.

These and other implementations can optionally include one or more of the following features. The media player is capable of presenting vector-based graphics, video and audio. The media player is capable of presenting the content according to a timeline. The operating system can be Binary Runtime Environment for Wireless (BREW), Symbian OS, or Windows Mobile. The event can be a result of a change in state of the mobile device, user interaction with the mobile device, or a network communication to the mobile device. Configuring the event handler further comprises registering the event handler such that the event handler will receive the event. The event handler is invoked and performs one or more actions that alter the presentation of the content. Presenting the content includes assigning the content to one or more layers of an imaging model; and rendering the content according to the layers. The event handler is associated with timeline-based content.

Particular implementations of the subject matter described in this specification can be implemented to realize one or more of the following advantages. Presentation of content can dynamically change based on OS-generated events. Content authors can create event-sensitive content by leveraging high-level content creation tools. Rich content can be presented on a mobile device's display without having to develop a rich content rendering framework. Event-sensitive content is easily portable to different mobile device OS's. New events can be added through a programming model.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1C:
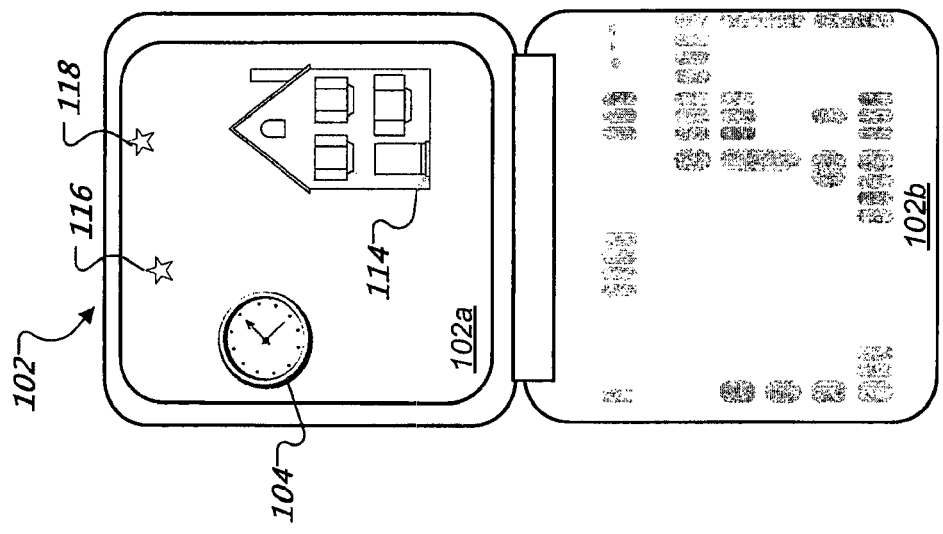
FIGS. 1A-C illustrate exemplary event-sensitive content on a mobile device.
Figure 1B:
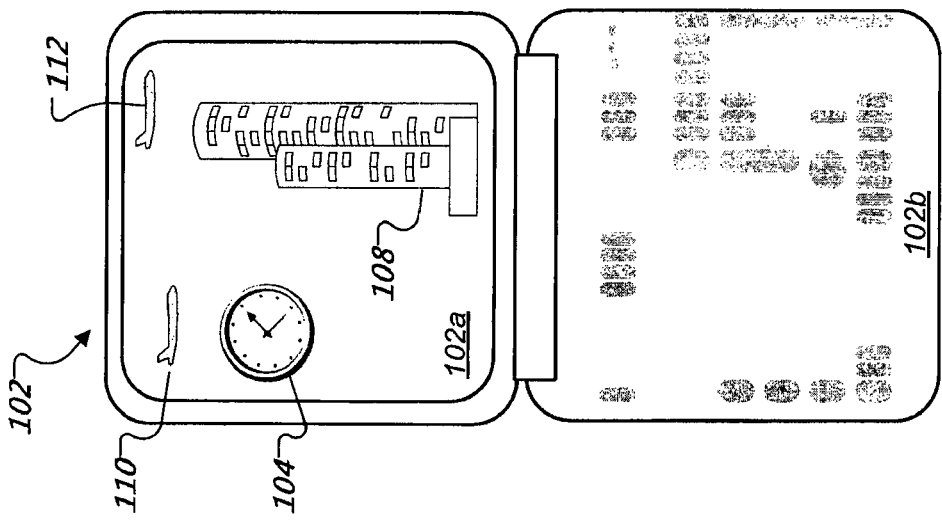
Figure 1A:
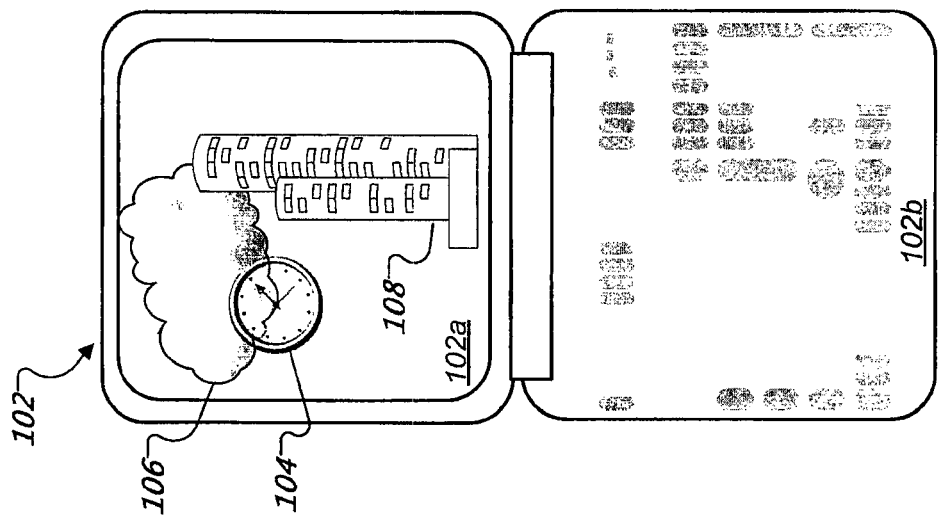

FIGS. 1A-C illustrate exemplary event-sensitive rich content, hereinafter referred to as content, on a mobile device 102 such as a smart phone or other portable device having an integrated telephone (e.g., a mobile phone, a voice over IP phone, a satellite phone, or other similar voice communication means) and a display 102a. Some mobile devices also include a keypad 102b for entering data. Others allow users to interact directly with the display 102a such as by touching the display 102a with a finger or a stylus. The display 102a presents content which can change dynamically based on events generated by the mobile device 102's OS. In various implementations, OS events such as those described in TABLE 1 below can be provided to an application presenting content on the display 102a. However, other events are possible. An event includes an explicit (e.g., a number or a string) or implicit (e.g., based on event data) identification of the event type, and optionally includes event data useful in deciphering the event. By way of illustration, a Change Location event includes a code identifying the event as Change Location and a geocode indicating the new geographic location of the mobile device.

TABLE 1

| EVENT | DESCRIPTION |
| --- | --- |
| Incoming Call | Sent when incoming call is initiated and when incoming call is answered. |
| Signal Level | Sent when the signal level changes. |
| Battery Level | Sent when the battery level changes. |
| Key Lock Status | Sent when the key lock status changes. |
| Charger Connection Status | Sent when the charger connection status changes. |
| Power Off | Sent when the mobile device is shutting down. |
| Voice Mail Status | Sent when voice mail status changes. |
| Handset Position | Sent when the mobile device is opened, closed, or the screen is rotated. |
| Wallpaper | Sent when the wallpaper changes. |

TABLE 1-continued

| EVENT | DESCRIPTION |
|---|---|
| Theme Style | Sent when the theme style (e.g., font size or display colors) changes. |
| Menu Style | Sent when the menu style (e.g., list or icons) changes. |
| Language | Sent when the language changes. |
| Soft key Text | Sent when the text associated with a soft key changes. |
| Network Mode | Sent when the network mode (e.g., single-band, dual-band, roaming, analog) changes. |
| Location Change | Sent when the mobile device changes geographic location. For example, when the mobile device leaves an area of a predetermined size and enters another area of a predetermined size. |

For example, the display 102a in FIG. 1A presents a prominent landmark 108 (e.g., a building or public structure) representing the current geographical location of the mobile device. The landmark 108 can be a static image, a vector graphic, an animation, or a video of the landmark, for instance. By way of further example, the landmark 108 can be a composite of different content types. A Location Change event indicating that the mobile device 102 has changed location is sent from the device 102's OS to an application that causes the content to be presented on the display 102a. In response to the event, the application determines an appropriate landmark to present based on location information contained within the event or referred to by the event. So, for example, if a user drove to a different city, the landmark 108 would automatically change to reflect the new location (e.g., landmark 114). In response to a Voice Mail Status event, the application can present animated airplanes 110 and 112 (or stars 116 and 118 if at night) representing, for instance, new voice mail messages. As a final illustration, the application can present a cloud 106 when, for example, a Signal Level event indicates that the signal quality is poor. When the signal improves, the cloud 106 can be automatically diminished in appearance.

Figure 2:
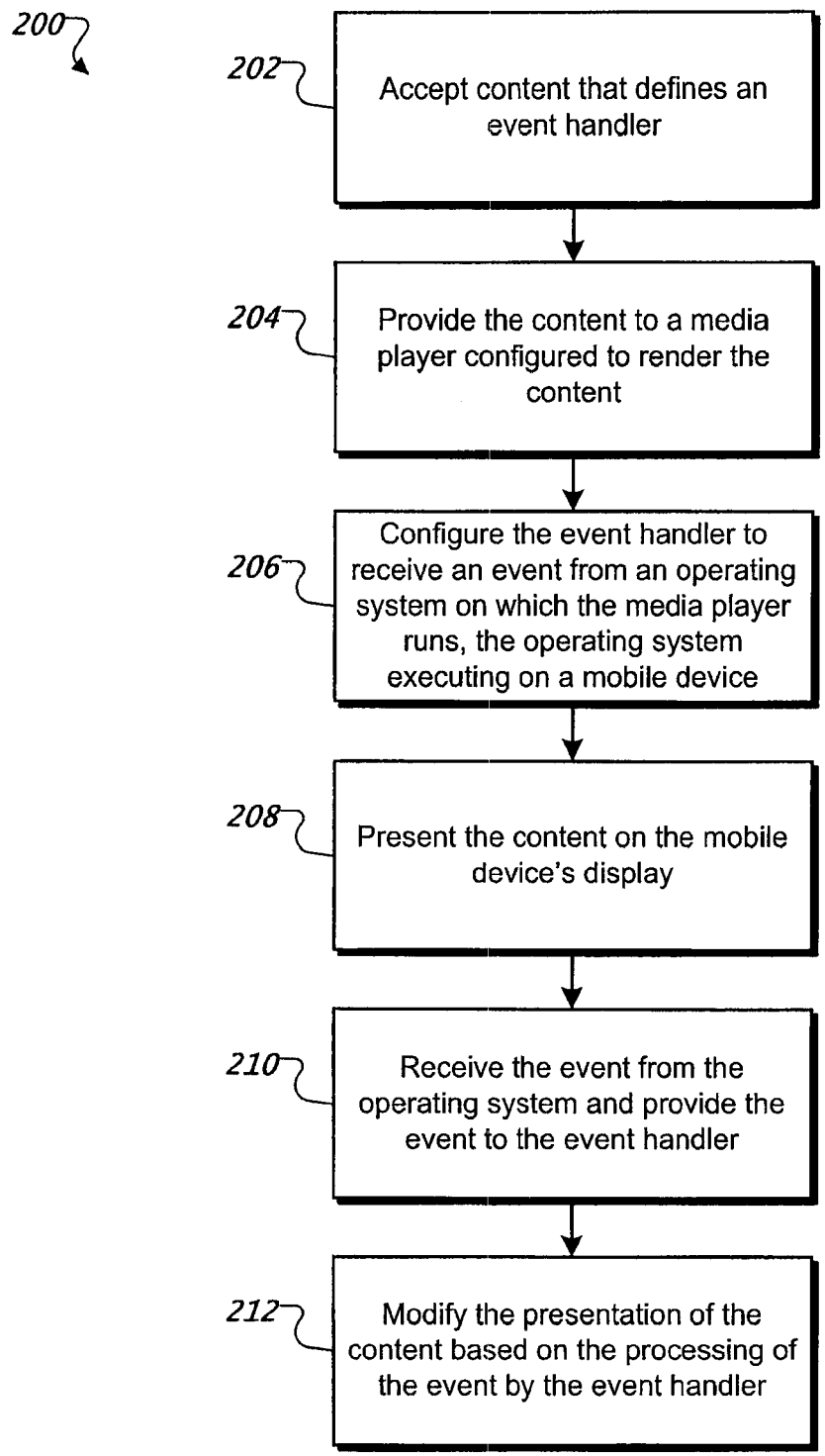
FIG. 2 is a flowchart of a method for providing operating system events to a media player.

FIG. 2 is a flowchart of a method 200 for providing mobile device OS events to a media player. A media player is capable of rendering rich content on a mobile device. In various implementations, the media player is Adobe Flash Lite, available from Adobe Systems Incorporated in San Jose, Calif. However, other media players and suitable software applications can be adapted for use with this method. Content is accepted that defines at least one event handler (step 202). In the case of an Adobe Flash Lite media player, the content in SWF format which is capable of being "played" or rendered by the media player on a mobile device's display and sound system. Other content formats are possible. Content can be stored in one or more digital files, a portion of a file that holds other content or information, or in a memory whether or not the content was first stored in a file.

Content includes the definition of at least one event handler which is particular to one or more OS-generated events and performs one or more actions based on the event. In various implementations, an event handler is defined in a programming language such as ActionScript or another ECMAScript-based language. However, the use of other imperative or declarative programming languages is possible. ActionScript is an object-oriented programming language for performing computations and manipulating movie-clips, text fields and sounds, for example. In other implementations, event handlers can be defined through descriptive data in the content rather than programming language statements.

An ExtendedEvents object in ActionScript is a global object whose members, methods and properties can be used without using a constructor. The listener members of this object are used to register event handlers for capturing OS-generated events. In various implementations, Flash movie clips register event handlers with specific event listeners using the ExtendedEvents object. New event types can be added by extending the ExtendedEvents object. Event handlers are objects that define an event handler function in order to handle specific events. The signatures of exemplary event handling functions are provided in TABLE 2, however other event handlers are possible.

TABLE 2

| EVENT HANDLER | METHOD | PARAMETERS | VALUES |
|---|---|---|---|
| IncomingCallEventHandler | onEvent( ) | name, number, group | String, String, String |
| SignalLevelEventHandler | onEvent( ) | signalLevel | Number This number is within the minimum and maximum values reported by the platform for this property. |
| BatteryLevelEventHandler | onEvent( ) | batteryLevel | Number |
| KeyLockStatusEventHandler | onEvent( ) | Status | String: [locked\|unlocked] |
| ChargerConnectionStatusEventHandler | onEvent( ) | Status | String: [charging\|notCharging] |
| PowerOffEventHandler | onEvent( ) | | |
| VoiceMailStatusEventHandler | onEvent( ) | messages | Number |
| HandsetPositionEventHandler | onEvent( ) | Position | String: [open\|closed\|rotated] |
| WallpaperEventHandler | onEvent( ) | wallpaper | String |
| ThemeStyleEventHandler | onEvent( ) | Theme | String |
| MenuStyleEventHandler | onEvent( ) | Style | String |
| LanguageEventHandler | onEvent( ) | language | Number |
| SoftkeyTextEventHandler | onEvent( ) | Softkey1, softkey2, softkey3, softkey4 | String, String, String, String |
| NetworkModeEventHandler | onEvent( ) | Mode | String: [single-band\|dual-band\|roaming\|analog] |
| LocationChangeEventHandler | onEvent( ) | Geocode | String A location (in geographic space) for the mobile device. |

Figures 3A, 3B:
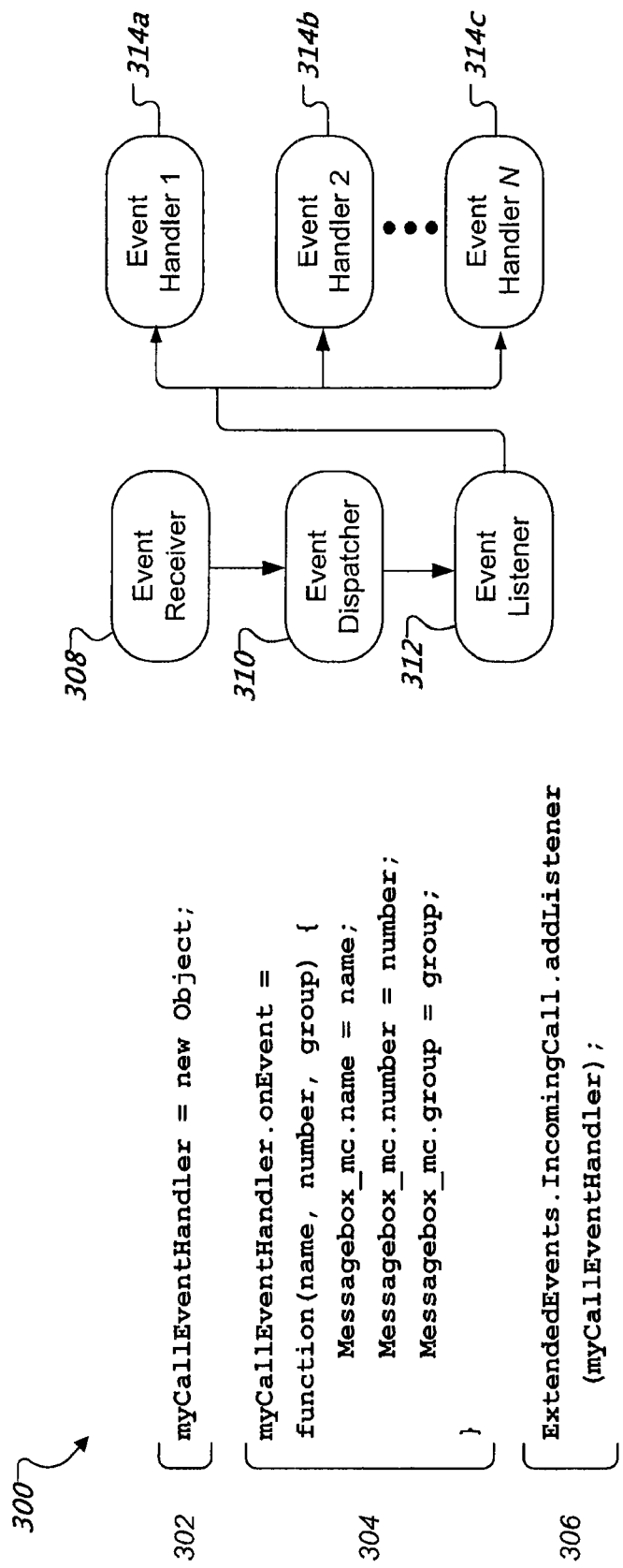
FIG. 3A illustrates an exemplary event handler definition and configuration.
FIG. 3B illustrates invocation of an event handler.

FIG. 3A illustrates an exemplary event handler definition and configuration 300. The ActionScript code statement 302 defines event handler object called myCallEventHandler, which is an instance of the Object class. The statements in part 304 define an event handler function onEvent for the event handler myCallEventHandler. Since the event handler in this example is for the Incoming Call event, the handler takes three string arguments (per TABLE 2): a name, a number and a group which serve to identify the caller.

Next, the content is provided to a media player configured to render the content (step 204). For example, a SWF file is provided to a Flash Lite player on a mobile device. The event handler defined in the content is then configured to receive an event from an operating system on which the media player runs; the operating system executes on a mobile device having an integrated display and an integrated telephone (step 206). For example, the code statements 306 configure the event handler function onEvent to receive Incoming Call events by adding the event handler object myCallEventHandler to the listener for the event: ExtendedEvents.IncomingCall (see TABLE 3 below).

TABLE 3

| EVENT | EVENT LISTENER |
| --- | --- |
| Incoming Call | ExtendedEvents.IncomingCall |
| Signal Level Changed | ExtendedEvents.SignalLevel |
| Battery Level Changed | ExtendedEvents.BatteryLevel |
| Key-Lock Status Changed | ExtendedEvents.KeyLockStatus |
| Charger Connection Status Changed | ExtendedEvents.ChargerConnectionStatus |
| Phone Shutting Down | ExtendedEvents.PowerOff |
| Voice Mail Status Changed | ExtendedEvents.VoiceMailStatus |
| Handset Position Changed | ExtendedEvents.HandsetPosition |
| Wallpaper Changed | ExtendedEvents.Wallpaper |
| Theme Style Changed | ExtendedEvents.ThemeStyle |
| Menu Style Changed | ExtendedEvents.MenuStyle |
| Language Changed | ExtendedEvents.Language |
| Softkey Text Changed | ExtendedEvents.SoftkeyText |
| Network Mode Changed | ExtendedEvents.NetworkMode |
| Location Changed | ExtendedEvents.LocationChange |

The content is then presented by the media player on the display (step 208). An event is then received from the operating system and provided the event handler (step 210). This is illustrated with reference to FIG. 3B. An event receiver component 308 in the media player receives the event from the mobile device OS. In various implementations, the media player registers the event receiver 308 with the mobile OS so that the OS will provide event notifications to the media player. The event receiver can decode the event, for example, by mapping an OS-specific event type (and optional data) to formats that are expected by event handlers (see TABLE 2 above). The event receiver 308 then provides the optionally reformatted event to an event dispatcher component 310. The event dispatcher 310 identifies the appropriate event listener for the event and then provides the event to the listener (e.g., 312; see TABLE 3 above). The event listener 312 then invokes each event handler function (e.g., 314a-c) that registered with the listener to receive the event (e.g., as shown in statement 306 in FIG. 3A). The event listener 312 can invoke the event handlers serially or in parallel, if threads are supported.

Finally, the presentation of the content is modified by the media player based on the processing of the event by the event handler (step 212). With reference to FIGS. 1A-C, an event handler for a Voice Mail Status event could cause the animated planes 110 and 112 to be presented with the content by loading a movie clip of the airplanes into the media player and causing the movie clip to be played.

Figure 4:
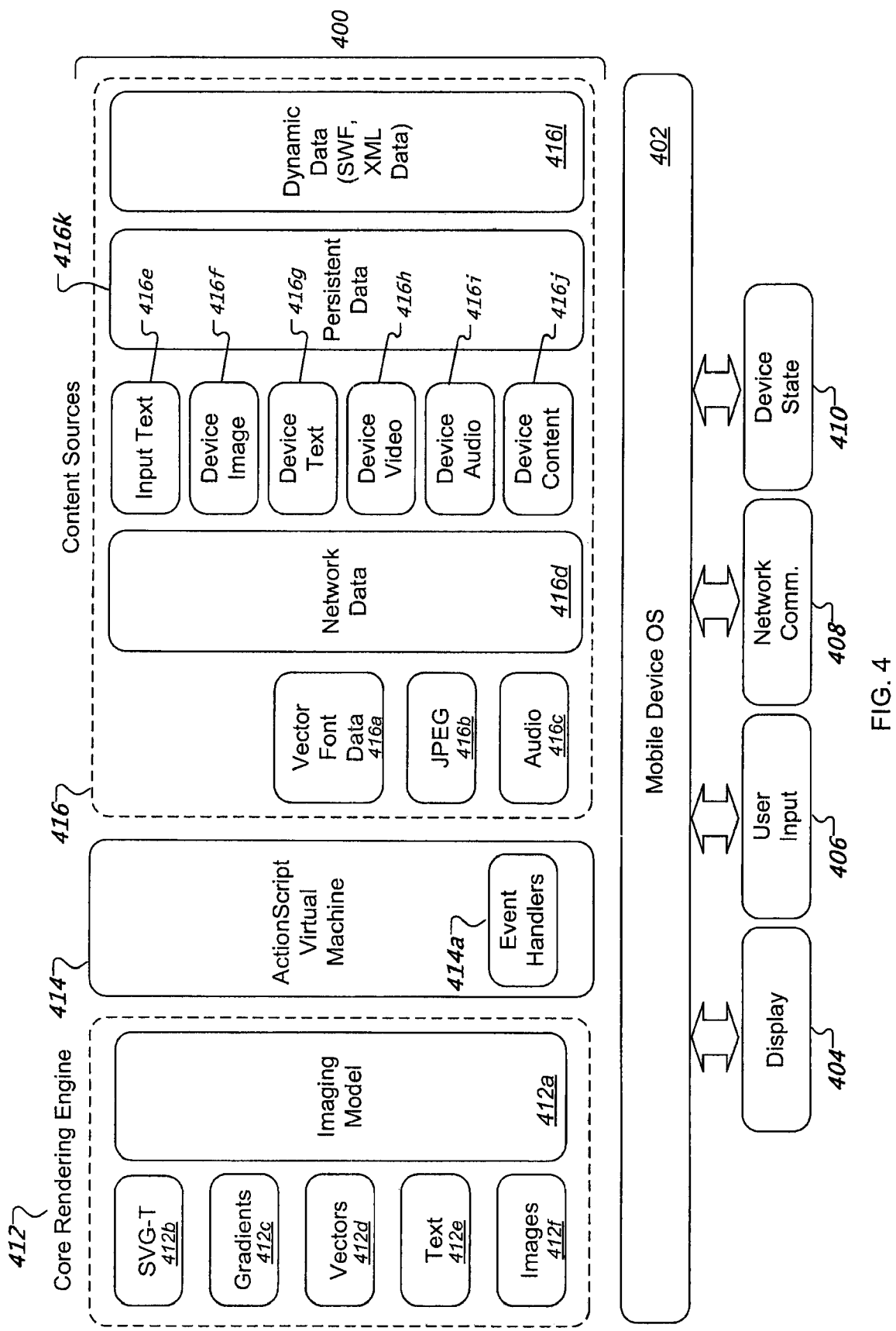
FIG. 4 is schematic diagram of a system for facilitating delivery of operating system events to content.

FIG. 4 is a schematic diagram of a system for facilitating delivery of mobile device OS events to content. A mobile device OS 402 provides an layer between applications, such as media player 400, and a mobile device's hardware components. The hardware components include, for instance, a display 404, user input devices 406 (e.g., keypad, mouse, touch screen, microphone), network communication devices 408 for communicating through wired or wireless networks (e.g., cellular, satellite, IEEE 802.11 based networks, other suitable networks, and combinations of these), and device state information 410 such as the device battery's remaining charge and network signal strength. Examples of suitable mobile device OS's are Symbian OS (available from Symbian, Inc.), Binary Runtime Environment for Wireless or "BREW" (available from Qualcomm Incorporated), and Windows Mobile (available from Microsoft Corporation). However, other OS's can also be used.

The media player 400 includes a rendering engine 412, a virtual machine 414 for defining and configuring event handlers 414a, and a variety of sources of content 416. In some implementations, the rendering engine 412 includes the ability to render content using an imaging model 412a according to one or more timelines associated with the content and a minimum frames per second rendering speed. For example, a Flash movie-clip is rendered according to its timeline. In some implementations, the rendering engine 412 natively includes the ability to render Scalable Vector Graphics Tiny (SVG-T) for small displays 412b, gradients 412c, vectors 412d, text 412e and images 412f.

The imaging model 412a includes a stack of logical rendering layers which, when composited together, create a presentation of the content on the display 404. Each piece of content 416 to be rendered is assigned to one of the layers. Content residing on lower layers is rendered beneath content on higher layers. Unless higher content is transparent, it will occlude content in lower layers occupying the same display space. Otherwise, the higher layer content is blended with content in the lower layers according to alpha channel blending rules, for instance. By way of illustration and with reference to FIG. 1A, note that the cloud 106 is partially occluded by the landmark 108, meaning the landmark is assigned to a higher rendering layer than the cloud. Also note that the clock face 104 which partially occludes the cloud 106 is transparent so that the cloud 106 shows through the clock face 104.

The virtual machine 414 is capable of executing programming language statements that define, configure and perform actions for event handlers 414a. The programming language statements can also control which content is provided to the rendering engine 412 and how the content is presented. In various implementations, the rendering engine 414 manages content through a Document Object Model (DOM) which is movie centric and can represent animations, audio, text and event handling. Programming language statements manipulate content sources 416 through programmatic objects that correspond to these sources. Content sources can include, but are not limited to, the following: vector font data 416a, Joint Photographic Experts Group (JPEG) images 416b, audio data 416c, data obtained over one or more network connections 416d, user input text 416e, data accessed through a codec provided by the mobile device OS (e.g., 416f-j), persistent data 416k from the mobile device, and dynamic data 416l.

Figure 5:
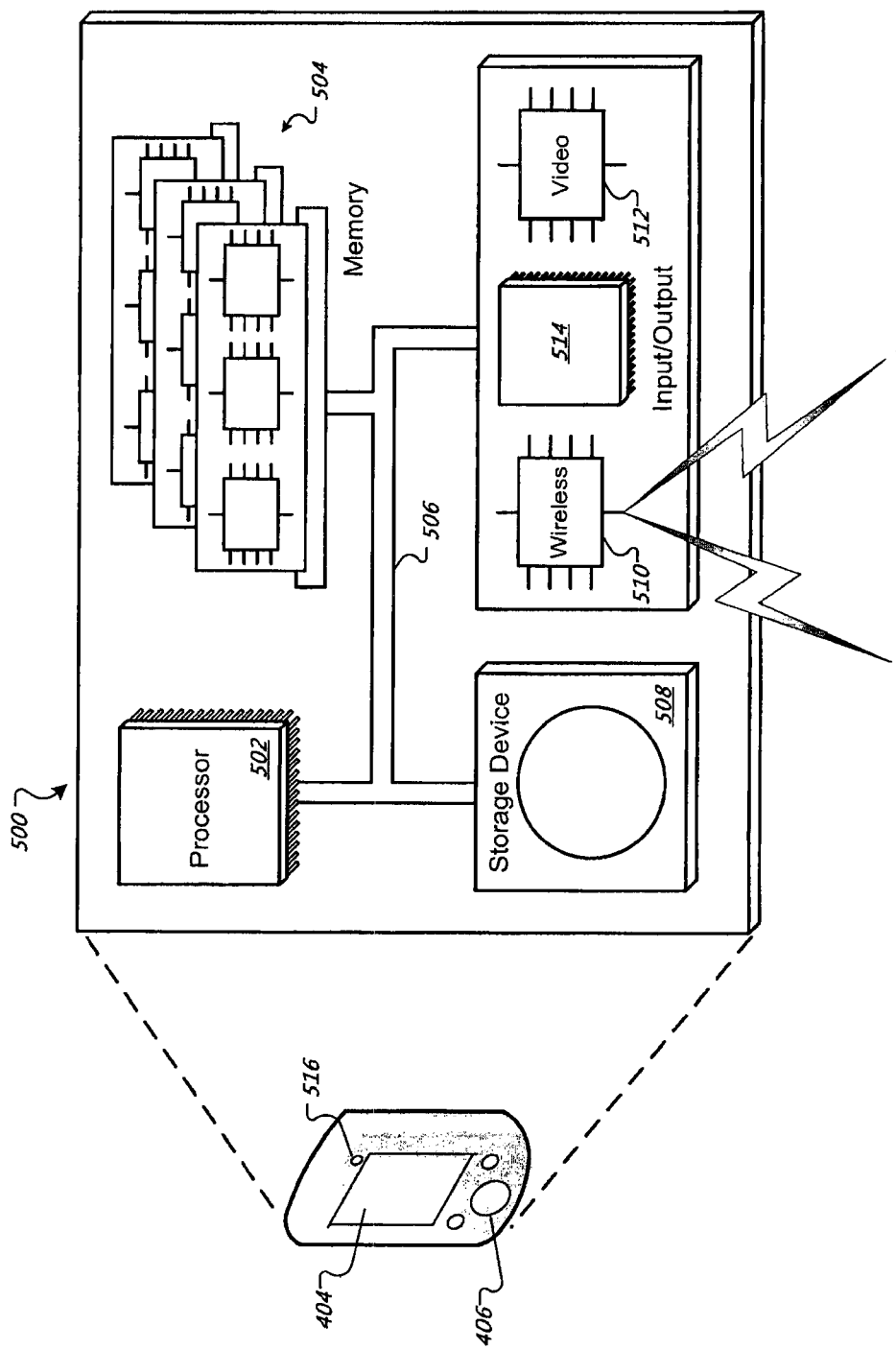
FIG. 5 is a schematic diagram of a generic mobile device.

FIG. 5 is a schematic diagram of a generic mobile device 500. Examples of representative mobile devices include the Samsung D900 available from Samsung, the Palm Treo from Palm, Inc., the Blackberry available from Research in Motion Corporation, and the Pocket PC which is available from various vendors. The mobile device 500 can be used for practicing operations described in association with the technique 200 and the system 400. The mobile device 500 minimally includes one or more processors 502, a memory 504, a storage device 508 and input/output devices that include a processor 514 for processing user input from keypads 406 and other devices, a wireless communication processor 510 and logic 512 for driving a display 404. Each of the components 502, 504, 508, 510 and 512 are interconnected using a system bus 506.

The processor 502 is capable of processing instructions for execution within the system device 500. Such executed instructions can implement one or more steps of method 200 or one or more components of system 400, for example. The processor 502 is a single or multi-threaded processor having one or more processor cores, for instance. The processor 502 is capable of processing instructions stored in the memory 504 or on the storage device 508 to display graphical information for a user interface on the display 404. The memory 504 is a computer readable medium such as volatile or non volatile random access memory that stores information within the system device 500. The memory 504 could store data structures representing content, for example. The storage device 508 is capable of providing persistent storage for the device 500. The storage device 508 may be a hard disk device, an optical disk device, a flash memory, or other suitable persistent storage means.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
accepting content that defines an event handler;
providing the content to a media player configured to render the content, wherein the media player runs on an operating system executing on a mobile device having an integrated display and an integrated telephone;
registering the event handler with an event listener of the operating system such that the event handler will receive an event from the operating system;
presenting the content by the media player on the display;
at an event receiver, receiving the event from the operating system and decoding the event into a format recognizable by the event handler;
providing the formatted event to an event dispatcher, wherein the event dispatcher identifies the event listener from multiple event listeners based on an event type of the formatted event and provides the formatted event to the event listener;
receiving, at the event listener, the formatted event provided by the event dispatcher, wherein the event listener provides the formatted event to the event handler; and
modifying the presentation of the content by the media player based on processing of the event by the event handler.

2. The method of claim 1 where:
the media player is capable of presenting vector-based graphics, video and audio.

3. The method of claim 1 where:
the media player is capable of presenting the content according to a timeline.

4. The method of claim 1 where:
the operating system is a wireless device operating system.

5. The method of claim 1 wherein:
the event is a result of a change in state of the mobile device, user interaction with the mobile device, or a network communication to the mobile device.

6. The method of claim 1 where modifying the presentation includes:
invoking the event handler where the event handler performs one or more actions that alter the presentation of the content.

7. The method of claim 1 where presenting the content includes:
assigning the content to one or more layers of an imaging model; and
rendering the content according to the layers.

8. The method of claim 1 where:
the event handler is associated with timeline-based content.

9. A computer program product, encoded on a computer-readable storage device, operable to cause data processing apparatus to perform operations comprising:
accepting content that defines an event handler;
providing the content to a media player configured to render the content, wherein the media player runs on an operating system executing on a mobile device having an integrated display and an integrated telephone;
registering the event handler with an event listener of the operating system such that the event handler will receive an event from the operating system;
presenting the content by the media player on the display;
at an event receiver, receiving the event from the operating system and decoding the event into a format recognizable by the event handler;
providing the formatted event to an event dispatcher, wherein the event dispatcher identifies the event listener from multiple event listeners based on an event type of the formatted event and provides the formatted event to the event listener;
receiving, at the event listener, the formatted event provided by the event dispatcher, wherein the event listener provides the formatted event to the event handler; and
modifying the presentation of the content by the media player based on processing of the event by the event handler.

10. The program product of claim 9 where:
the media player is capable of presenting vector-based graphics, video and audio.

11. The program product of claim 9 where:
the media player is capable of presenting the content according to a timeline.

12. The program product of claim 9 where:
the operating system is a wireless device operating system.

13. The program product of claim 9 where:
the event is a result of a change in state of the mobile device, user interaction with the mobile device, or a network communication to the mobile device.

14. The program product of claim 9 where modifying the presentation further includes operations comprising:
invoking the event handler where the event handler performs one or more actions that alter the presentation of the content.

15. The program product of claim 9 where presenting the content further includes operations comprising:

assigning the content to one or more layers of an imaging model; and rendering the content according to the layers.

16. The program product of claim 9 where:

the event handler is associated with timeline-based content.

17. An apparatus comprising:

an integrated display and an integrated telephone;

an operating system; and one or more processors operable to interact with the display and configured to perform operations comprising:

accepting content that defines an event handler;

providing the content to a media player configured to render the content, wherein the media player runs on an operating system executing on a mobile device having an integrated display and an integrated telephone;

registering the event handler with an event listener of the operating system such that the event handler will receive an event from the operating system;

presenting the content by the media player on the display;

at an event receiver receiving the event from the operating system and decoding the event into a format recognizable by the event handler;

providing the formatted event to an event dispatcher, wherein the event dispatcher identifies the event listener from multiple event listeners based on an event type of the formatted event and provides the formatted event to the event listener;

receiving, at the event listener, the formatted event provided by the event dispatcher, wherein the event listener provides the formatted event to the event handler, and modifying the presentation of the content by media player based on processing of the event by the event handler.

18. The apparatus of claim 17 where:

the media player is capable of presenting vector-based graphics, video and audio.

19. The apparatus of claim 17 where:

the media player is capable of presenting the content according to a timeline.

20. The apparatus of claim 17 where modifying the presentation includes:

invoking the event handler where the event handler performs one or more actions that alter the presentation of the content.

21. The apparatus of claim 17 where presenting the content includes:

assigning the content to one or more layers of an imaging model; and rendering the content according to the layers.

22. The apparatus of claim 17 where:

the event handler is associated with timeline-based content.

* * * * *